A. HUMBERGER.
Corn Harvester.
No. 27,720.
Patented April 3, 1860.
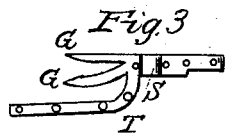
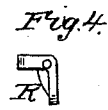
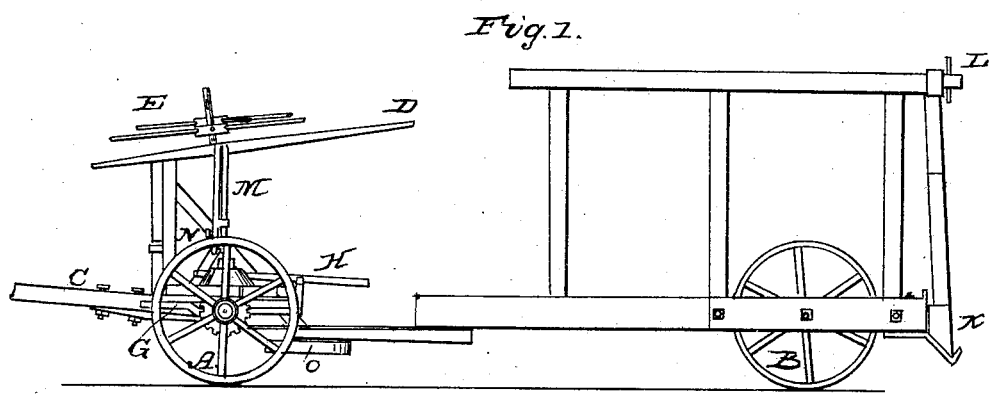
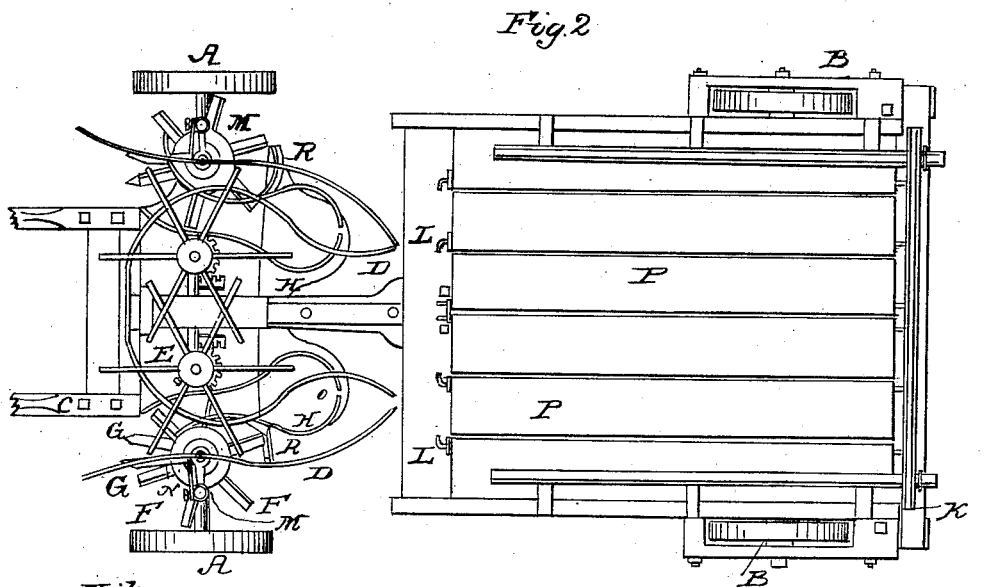
Witnesses
Daniel Breed
Edm. F. Brown
Inventor
Adam Humberger

UNITED STATES PATENT OFFICE.

ADAM HUMBERGER, OF SOMERSET, OHIO.

IMPROVEMENT IN CORN-HARVESTERS.

Specification forming part of Letters Patent No. 27,720, dated April 3, 1860.

*To all whom it may concern:*

Be it known that I, ADAM HUMBERGER, of Somerset, in the county of Perry and State of Ohio, have invented a new and useful Improvement in Corn-Harvesters; and I do hereby declare that the following is a full and exact description thereof, reference being had to the accompanying drawings, and to the letters of reference marked thereon.

In the accompanying drawings, Figure 1 represents a side view of my improved corn-harvester. Fig. 2 is a top view of the same. Fig. 3 is a bottom view of the hound and fingers detached from the rest of the machine. Fig. 4 is a rear view of the hound, showing the position of the knife R.

My invention consists in an improved arrangement of the platform or drop for shocking the corn, and in the arrangement of the knives or cutters, spring-guard, and clamp for controlling the stalks, with a knife to prevent choking the machine.

My machine is intended for cutting and shocking corn at a single operation. It is supported on four wheels, A and B, running like a common wagon, and drawn by a horse attached to shafts C, which in the drawings are seen broken away.

The horse travels between two rows of corn, drawing the machine so that the cornstalks will come between the shaft C and the guard D. As the machine advances the lower part of the stalks are caught between the fingers G. At this moment the tops of the stalks are also caught by the reel-arms E, which revolve by means of suitable gearing connected with the forward axle, as seen in Figs. 1 and 2. In like manner the knives F also revolve, sweeping across the fingers G, and thus cutting off the stalks of corn. These fingers and the forward edge of the platform are armed with knives, so that the sweep of the revolving knives F gives a shear cut.

When the stalks of corn are cut off they do not fall down, but are carried backward upon the machine in a standing position by the action of the reel-arms E and the revolving knives F, in connection with the two sets of guides, D and H. As the stalks escape from the knives and the reel-arms they collect in an armful, held by the rear end of the guards. A man riding upon the platform P takes the corn from the guards and places it upon the platform P until a sufficient quantity is thus accumulated to form a shock. Then the workman steps behind the machine, pulls out the pins, and then seizing the end-gate, K, pulls it out. This action draws the separate boards of the platform a short distance backward, and at the same time lets the rear ends of the boards fall. As the boards are drawn backward their forward ends slide from the cross-bar, being held only by the hooks L, when the boards instantly turn edgewise, thus allowing the shock of corn to fall through the platform to the ground in a standing or upright position. As the horse moves forward the boards of the platform are drawn from the shock of corn, when the end gate, K, may be replaced and the platform rearranged to receive another shock of corn.

The spring-guards D are adjustable to different heights upon the standard M, being fixed by means of thumb-screws N. This standard M is inclined outward toward the wheel A, in order to give room for the ears of corn to pass, and thus prevent the latter from being caught by the standard.

The forward axle of the machine is divided, so that each wheel A may revolve independently of the other. The small platform O is hinged in front, so that the rear or lower edge may better pass stones, stumps, or other obstacles.

The fingers G and the axle-box S (seen best in Fig. 3) may be cast in the same piece with the hounds T. Attached to the rear part of the hounds is a small knife, R, for cutting off an occasional stalk of corn which may be bent or broken so as to slide under the rear end of the hounds, and thus, unless cut away, be liable to choke the machine. This knife is best seen at R, Fig. 4.

My machine may be somewhat varied without departing from the principles of my invention.

Having thus fully described my invention, what I claim, and desire to secure by Letters Patent of the United States, is—

1. The sectional platform P, arranged upon the frame, and pivoted as described, in combination with the rear end-gate, for operation in the manner and for the purpose specified.

2. The arrangement of the spring-guards D and H and knife R, in combination with the cutting apparatus, as constructed and applied, and operating together in the manner and for the purpose specified.

ADAM HUMBERGER.

Witnesses:
DANIEL BREED,
EDM. F. BROWN.